Patented Sept. 1, 1925.

1,551,750

UNITED STATES PATENT OFFICE.

JAMES G. KELLY AND HOLMES HALL, OF SEDALIA, MISSOURI.

SOLDER.

No Drawing.     Application filed April 18, 1924. Serial No. 707,420.

*To all whom it may concern:*

Be it known that we, JAMES G. KELLY and HOLMES HALL, citizens of the United States, residing in the city of Sedalia, county of Pettis, and State of Missouri, have invented certain new and useful Improvements in Solders, of which the following is a specification.

This invention relates to improvements in solders, and particularly to the solders utilized generally in uniting metals, but especially adapted for use in soldering aluminum and cast iron.

The solder which forms the subject of this invention is an alloy of zinc, cadmium and tin,—and may also contain lead as hereinafter described.

To zinc is ascribed the quality of having a particular affinity for aluminum. In addition to this affinity for aluminum, it also gives strength to the alloy. Tin is used to give body to the alloy and to make it sufficiently soft to be melted and used with the common type of soldering iron (or copper), and likewise to give fluidity to the alloy when melted. Cadmium has the qualities of not only giving strength and a certain amount of fluidity to the alloy, but particularly to reduce the melting point.

A small quantity or percentage of cadmium with zinc, tin and lead has the effect of materially lowering the melting point of the combination, and produces a more perfect and uniform union, or what is termed as "a more perfect alloy," that is, the combination when melted will retain the exact proportions or percentages and will not vary with subsequent solidification.

In making the solder, it has been found most desirable and beneficial to use a sufficient amount of zinc to properly adhere to the aluminum or other metals to be united, at the same time limiting the quantity or proportion in order that the melting point is not excessive in order that the solder may be easily melted with a common type of soldering device. It has been found that, by using from 25% to 40% of zinc, the best and most satisfactory results are obtained. The percentage of cadmium, which produces the most advantageous alloy, has been found to be substantially between 3% and 15%.

When making solders primarily for aluminum, it has been found under certain conditions advantageous to eliminate the lead content,—combining tin with zinc and cadmium. The relative proportions or percentages may, of course, be varied according to the use or purpose and conditions to which the union is subjected, but normally the preferred formula is substantially 35% zinc, 5% cadmium and 60% tin.

In making solders for cast iron, galvanized iron or other metals,—in other words, when it is desired to use a mixture for general soldering purposes, a small percentage usually from 5% to 20% of lead,—the same being substitute for a portion of the tin,—is introduced. When incorporating lead in this type of solder, it is essential that a greater percentage of tin than lead is at all times maintained. The lead seems to give more body to the alloy and in addition acts as a binder and, while a small percentage of lead is recommended for alloys used for general soldering purposes, such as cast iron, galvanized iron and other metals, such an alloy will also successfully solder aluminum.

The variations in the percentages of tin and lead are not considered as elements of novelty in the present invention, but are rather factors which are altered according to the particular requirements for the alloy, that is, the melting point desired, the particular metals to be united, and the desired strength of the union.

In making alloys with cadmium as an element, the above percentages produce a melting point below 650° F. and can readily be melted and used with an ordinary soldering iron. By varying the proportions of zinc and cadmium between the figures above mentioned, this melting point may be varied. Under certain conditions the melting point may be reduced to, or below, 400° F., while the maximum melting point is in the neighborhood of 650° F., as temperatures above this point produce difficulties when using the common type of soldering iron. Thus, where the solder is subjected to relatively high temperatures, as in the case of repairing scored cylinders in internal combustion engines, the melting point of solder used must be sufficiently high to prevent disintegration. When used for sweating metal sheets, a much lower melting point solder is advisable and a low melting point alloy desirable.

This invention includes all combinations of the above metals where the alloy is used for soldering purposes and is dependent upon the affinity which zinc has for aluminum. In its scope, it also includes combinations of the metals above mentioned where cadmium is used to reduce the melting point of the alloy below 650° F.

The preferred formula, when using the four metals, is substantially 50% tin, 10% lead, 35% zinc and 5% cadmium.

It will be noted that, when the three metals are used alone—that is, zinc, cadmium and tin—, the percentage of tin used is greater than that of zinc and the percentage of zinc is greater than that of cadmium. When lead is used in the alloy with the three metals above mentioned, the percentage of tin is greater than that of lead, and the percentage of tin and lead combined is greater than that of zinc, while the percentage of zinc is greater than that of cadmium. Any combination of these metals within the ranges and proportions stated, are considered within the scope of the invention.

We claim as our invention:

1. A new composition of matter for soldering purposes containing a percentage of zinc ranging from 25% to 40%, a percentage of cadmium ranging from 3% to 15%, and the remainder tin.

2. A solder containing zinc, tin and cadmium in the proportion of 60% tin, 35% zinc and 5% cadmium.

3. A solder compound containing 3% to 15% cadmium, 25% to 40% zinc and the remainder tin and lead,—the amount of tin being in excess of the amount of lead.

4. A solder containing tin, lead, zinc and cadmium in substantially the proportions of 50% tin, 10% lead, 35% zinc and 5% cadmium.

5. A solder containing tin, lead, zinc and cadmium, the proportion of tin not in excess of 82% and greater than that of lead, and the proportion of tin and lead combined being greater than that of the zinc, and the proportion of zinc not in excess of 40% being greater than that of the cadmium.

6. A solder containing 3% to 15% cadmium, 25% to 40% zinc and 45% to 72% tin.

JAMES G. KELLY.
HOLMES HALL.